United States Patent
Yoo et al.

(10) Patent No.: US 8,675,560 B2
(45) Date of Patent: Mar. 18, 2014

(54) UE RECEIVER REFERENCE SIGNAL PROCESSING THAT UTILIZES RESOURCE PARTITIONING INFORMATION

(75) Inventors: Taesang Yoo, San Diego, CA (US); Siddhartha Mallik, San Deigo, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 13/225,121

(22) Filed: Sep. 2, 2011

(65) Prior Publication Data

US 2012/0057480 A1    Mar. 8, 2012

Related U.S. Application Data

(60) Provisional application No. 61/380,079, filed on Sep. 3, 2010.

(51) Int. Cl.
 *H04W 4/00*        (2009.01)

(52) U.S. Cl.
 USPC .......................................................... 370/328

(58) Field of Classification Search
 None
 See application file for complete search history.

(56) References Cited

U.S. PATENT DOCUMENTS

| | | | |
|---|---|---|---|
| 2007/0177501 A1* | 8/2007 | Papasakellariou | 370/229 |
| 2009/0081955 A1* | 3/2009 | Necker | 455/63.1 |
| 2009/0197538 A1* | 8/2009 | Borran et al. | 455/63.1 |
| 2009/0268684 A1 | 10/2009 | Lott et al. | |
| 2009/0290550 A1* | 11/2009 | Bhattad et al. | 370/329 |
| 2010/0008282 A1* | 1/2010 | Bhattad et al. | 370/312 |
| 2010/0110886 A1* | 5/2010 | Sorri et al. | 370/229 |
| 2010/0195582 A1 | 8/2010 | Koskinen | |
| 2010/0238877 A1 | 9/2010 | Nam et al. | |
| 2010/0248730 A1* | 9/2010 | Han et al. | 455/450 |
| 2010/0296591 A1* | 11/2010 | Xu et al. | 375/259 |
| 2010/0309876 A1 | 12/2010 | Khandekar et al. | |
| 2010/0323624 A1* | 12/2010 | Narayan et al. | 455/63.1 |
| 2011/0051676 A1* | 3/2011 | Josiam et al. | 370/329 |
| 2011/0092231 A1 | 4/2011 | Yoo et al. | |
| 2011/0170435 A1 | 7/2011 | Kim et al. | |
| 2011/0211486 A1* | 9/2011 | GoldHammer | 370/252 |

(Continued)

FOREIGN PATENT DOCUMENTS

| | | |
|---|---|---|
| WO | 2009112928 A2 | 9/2009 |
| WO | 2010078590 A1 | 7/2010 |

OTHER PUBLICATIONS

International Search Report and Written Opinion of the International Searching Authority for PCT Patent Application Serial No. PCT/US2011/050458 dated Dec. 2, 2011.

*Primary Examiner* — Otis L Thompson, Jr.
(74) *Attorney, Agent, or Firm* — Patterson & Sheridan, LLP

(57) ABSTRACT

Communication in a dominant interference scenario may be supported by performing inter-cell interference coordination (ICIC). According to certain aspects of ICIC, resource coordination/partitioning may be performed to allocate resources to a serving Node B located near the vicinity of a strong interfering Node B. The interfering Node B may avoid transmitting on the allocated/protected resources, but transmissions from the interfering Node B on resources not allocated to the serving Node B (i.e., unprotected) may cause significant interference on cell-specific reference signal (CRS) tones of the serving Node B. Therefore, if the CRS tones of the unallocated/unprotected resources are used, performance degradation may result to various operations of the serving Node B. Therefore, certain aspects of the present disclosure provide techniques for a UE receiver in utilizing resource partitioning information (RPI) for performing CRS processing in a heterogeneous network (HetNet).

68 Claims, 8 Drawing Sheets

(56) References Cited

U.S. PATENT DOCUMENTS

| | | | |
|---|---|---|---|
| 2011/0211503 A1* | 9/2011 | Che et al. | 370/280 |
| 2011/0312355 A1* | 12/2011 | Cheng et al. | 455/501 |
| 2011/0319066 A1* | 12/2011 | Chou et al. | 455/422.1 |
| 2012/0108177 A1* | 5/2012 | Miao et al. | 455/67.11 |
| 2012/0134275 A1* | 5/2012 | Choi et al. | 370/241 |
| 2012/0207044 A1* | 8/2012 | Johansson et al. | 370/252 |
| 2012/0250526 A1* | 10/2012 | Zhao et al. | 370/243 |
| 2013/0017793 A1* | 1/2013 | Henttonen et al. | 455/63.1 |
| 2013/0033998 A1* | 2/2013 | Seo et al. | 370/252 |
| 2013/0077543 A1* | 3/2013 | Kim et al. | 370/281 |
| 2013/0107704 A1* | 5/2013 | Dinan | 370/230 |

* cited by examiner

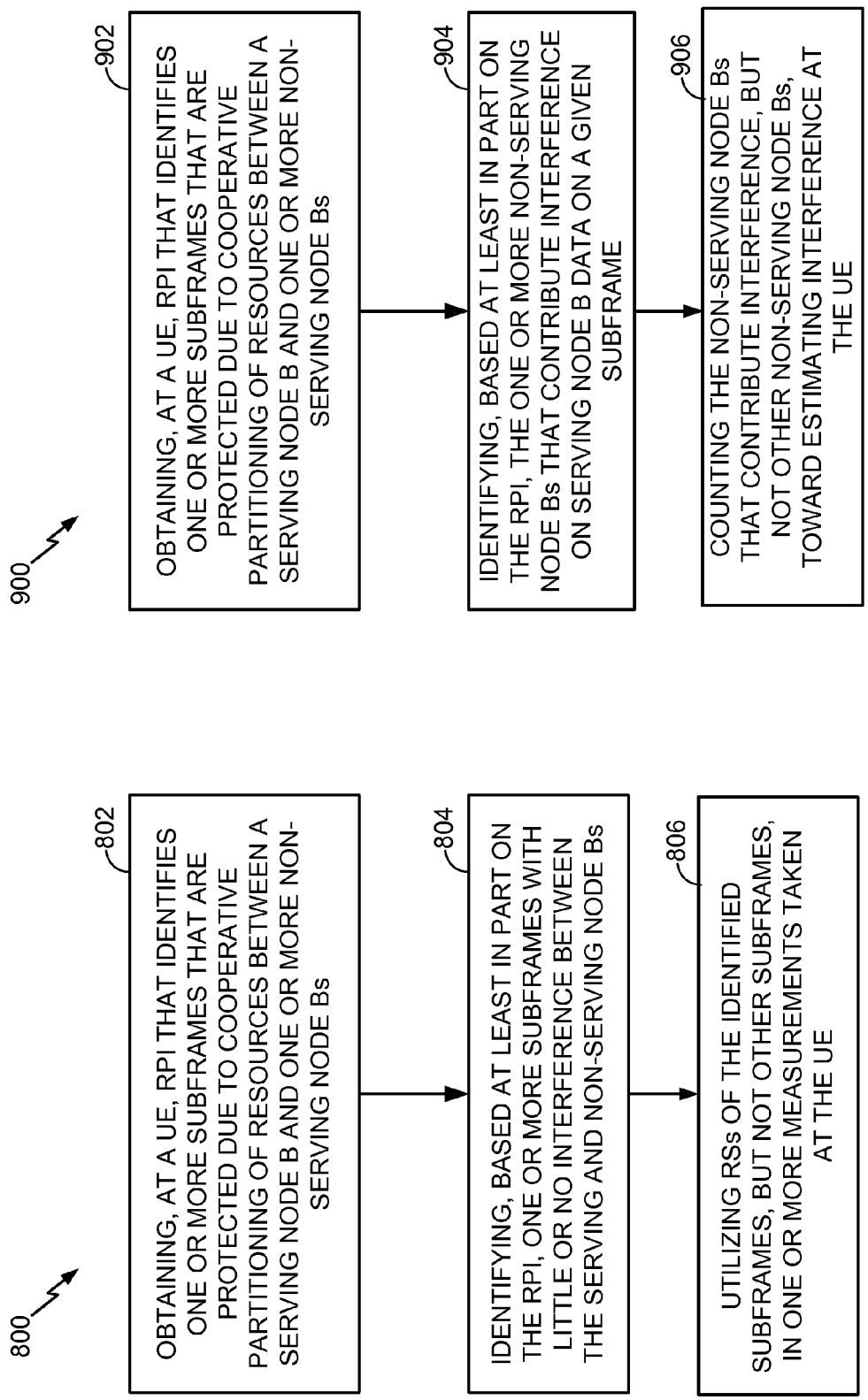

UE RECEIVER REFERENCE SIGNAL PROCESSING THAT UTILIZES RESOURCE PARTITIONING INFORMATION

CROSS-REFERENCE TO RELATED APPLICATION

This application claims priority to U.S. Provisional Application Ser. No. 61/380,079, filed on Sep. 3, 2010, which is expressly incorporated by reference herein in its entirety.

BACKGROUND

I. Field

Certain embodiments of the present disclosure generally relate to wireless communications and, more particularly, to reference signal processing techniques that utilize resource partitioning information.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communication is provided. The method generally includes obtaining, at a user equipment (UE), resource partitioning information (RPI) that identifies one or more subframes that are protected due to cooperative partitioning of resources between a serving Node B and one or more non-serving Node Bs, identifying, based at least in part on the RPI, one or more subframes with little or no interference between the serving and non-serving Node Bs, and utilizing reference signals (RSs) of the identified subframes, but not other subframes, in one or more measurements taken at the UE.

In an aspect of the disclosure, an apparatus for wireless communications is provided. The apparatus generally includes means for obtaining, at a UE, RPI that identifies one or more subframes that are protected due to cooperative partitioning of resources between a serving Node B and one or more non-serving Node Bs, means for identifying, based at least in part on the RPI, one or more subframes with little or no interference between the serving and non-serving Node Bs, and means for utilizing RSs of the identified subframes, but not other subframes, in one or more measurements taken at the UE.

In an aspect of the disclosure, an apparatus for wireless communications is provided. The apparatus generally includes at least one processor and a memory coupled to the at least one processor. The at least one processor is generally configured to obtain, at a UE, RPI that identifies one or more subframes that are protected due to cooperative partitioning of resources between a serving Node B and one or more non-serving Node Bs, identify, based at least in part on the RPI, one or more subframes with little or no interference between the serving and non-serving Node Bs, and utilize RSs of the identified subframes, but not other subframes, in one or more measurements taken at the UE.

In an aspect of the disclosure, a computer-program product for wireless communications is provided. The computer-program product generally includes a computer-readable medium having code for obtaining, at a UE, RPI that identifies one or more subframes that are protected due to cooperative partitioning of resources between a serving Node B and one or more non-serving Node Bs, identifying, based at least in part on the RPI, one or more subframes with little or no interference between the serving and non-serving Node Bs, and utilizing RSs of the identified subframes, but not other subframes, in one or more measurements taken at the UE.

In an aspect of the disclosure, a method for wireless communication is provided. The method generally includes obtaining, at a UE, RPI that identifies one or more subframes that are protected due to cooperative partitioning of resources between a serving Node B and one or more non-serving Node Bs, identifying, based at least in part on the RPI, the one or more non-serving Node Bs that contribute interference on serving Node B data on a given subframe, and counting the non-serving Node Bs that contribute interference, but not other non-serving Node Bs, toward estimating interference at the UE.

In an aspect of the disclosure, an apparatus for wireless communications is provided. The apparatus generally includes means for obtaining, at a UE, RPI that identifies one or more subframes that are protected due to cooperative partitioning of resources between a serving Node B and one or more non-serving Node Bs, means for identifying, based at least in part on the RPI, the one or more non-serving Node Bs that contribute interference on serving Node B data on a given subframe, and means for counting the non-serving Node Bs that contribute interference, but not other non-serving Node Bs, toward estimating interference at the UE.

In an aspect of the disclosure, an apparatus for wireless communications is provided. The apparatus generally includes at least one processor and a memory coupled to the at least one processor. The at least one processor is generally configured to obtain, at a UE, RPI that identifies one or more subframes that are protected due to cooperative partitioning of resources between a serving Node B and one or more non-serving Node Bs, identify, based at least in part on the RPI, the one or more non-serving Node Bs that contribute interference on serving Node B data on a given subframe, and count the non-serving Node Bs that contribute interference, but not other non-serving Node Bs, toward estimating interference at the UE.

In an aspect of the disclosure, a computer-program product for wireless communications is provided. The computer-program product generally includes a computer-readable medium having code for obtaining, at a UE, RPI that identifies one or more subframes that are protected due to cooperative partitioning of resources between a serving Node B and one or more non-serving Node Bs, identifying, based at least in part on the RPI, the one or more non-serving Node Bs that contribute interference on serving Node B data on a given subframe, and counting the non-serving Node Bs that contribute interference, but not other non-serving Node Bs, toward estimating interference at the UE.

BRIEF DESCRIPTION OF THE DRAWINGS

FIG. 8 illustrates example operations for performing CRS processing using subframes with little or no interference between a serving Node B and one or more non-serving Node Bs, in accordance with certain aspects of the present disclosure.

FIG. 9 illustrates example operations for performing partitioning-aware interference estimation, in accordance with certain aspects of the present disclosure.

DETAILED DESCRIPTION

Communication in a dominant interference scenario may be supported by performing inter-cell interference coordination (ICIC). According to certain aspects of ICIC, resource coordination/partitioning may be performed to allocate resources to a serving Node B located near the vicinity of a strong interfering Node B. The interfering Node B may avoid transmitting on the allocated/protected resources, but transmissions from the interfering Node B on resources not allocated to the serving Node B (i.e., unprotected) may cause significant interference on cell-specific reference signal (CRS) tones of the serving Node B. Therefore, if the CRS tones of the unallocated/unprotected resources are used, performance degradation may result to various operations of the serving Node B. Therefore, certain aspects of the present disclosure provide techniques for a UE receiver in utilizing resource partitioning information (RPI) for performing CRS processing in a heterogeneous network (HetNet).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
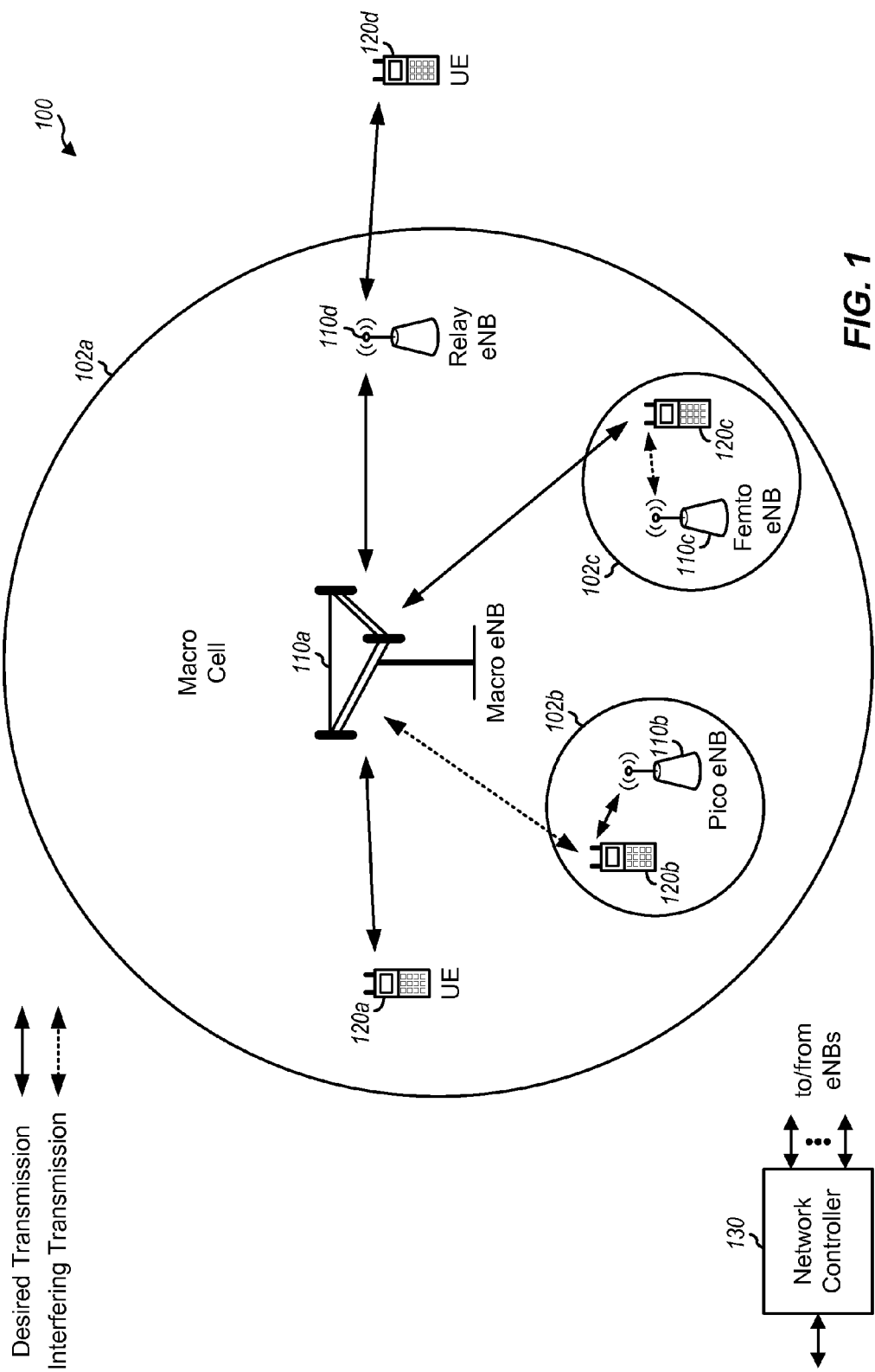
FIG. 1 is a block diagram conceptually illustrating an example of a wireless communications network in accordance with certain aspects of the present disclosure.

FIG. 1 shows a wireless communication network 100 in which procedures described for performing reference signal processing utilizing resource partitioning information may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 120a, an eNB 110b may be a pico eNB for a pico cell 120b, and an eNB 110c may be a femto eNB for a femto cell 120c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

As will be described in greater detail below, according to certain aspects, eNBs may perform inter-cell interference coordination (ICIC). ICIC may involve negotiation between eNBs to achieve resource coordination/partitioning to allocate resources to an eNB located near the vicinity of a strong interfering eNB. The interfering eNB may avoid transmitting on the allocated/protected resources, possibly except for a cell-specific reference signal (CRS). A UE can then communicate with the eNB on the protected resources in the presence of the interfering eNB and may observe no interference (possibly except for the CRS) from the interfering eNB UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
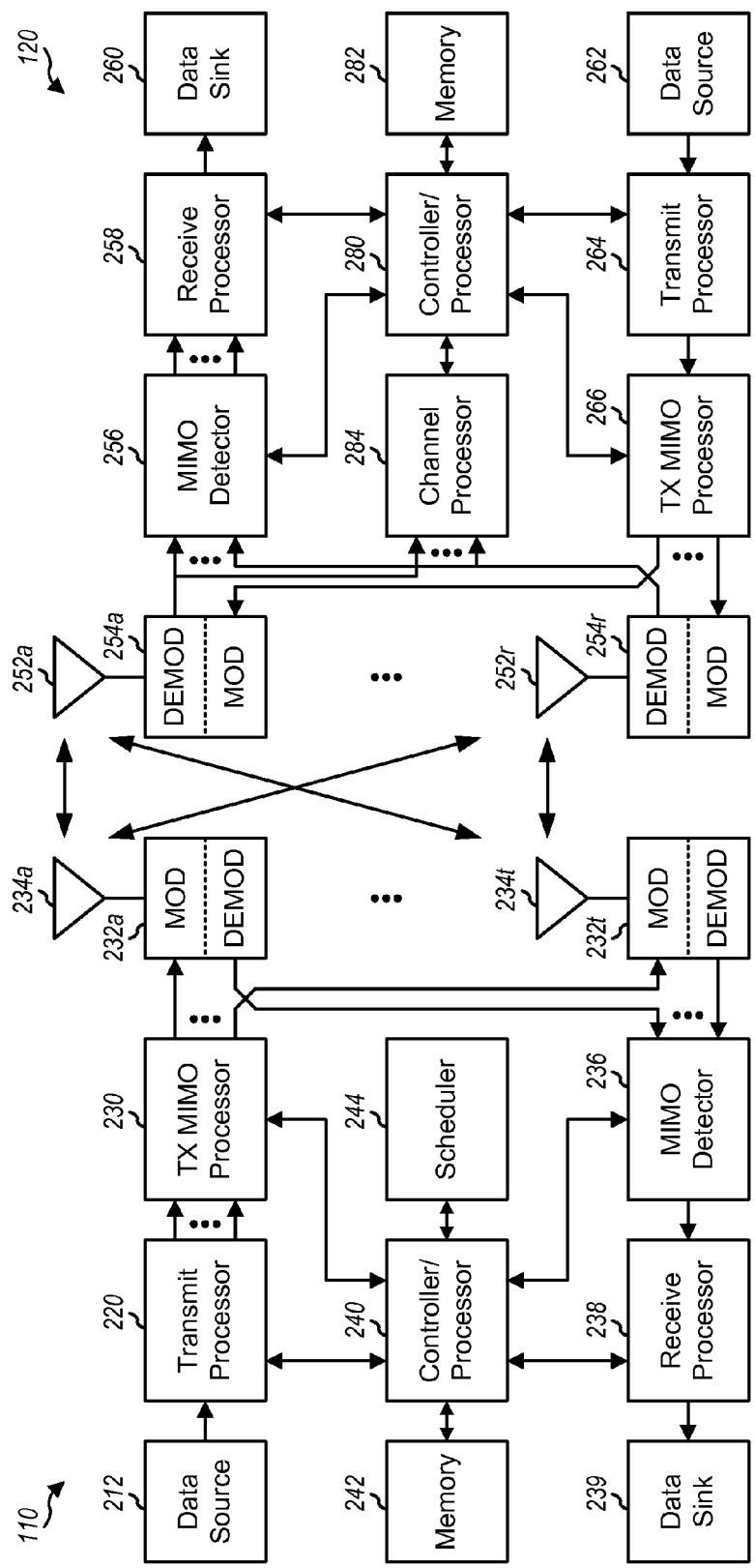
FIG. 2 shows a block diagram conceptually illustrating an example of a Node B in communication with a user equipment device (UE) in a wireless communications network in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedures described herein. Memories 242 and 282 may store data and program codes for base station 110 and UE 120, respectively. A scheduler 244 may schedule UEs for data transmission on the downlink and/or uplink.

Figure 3:
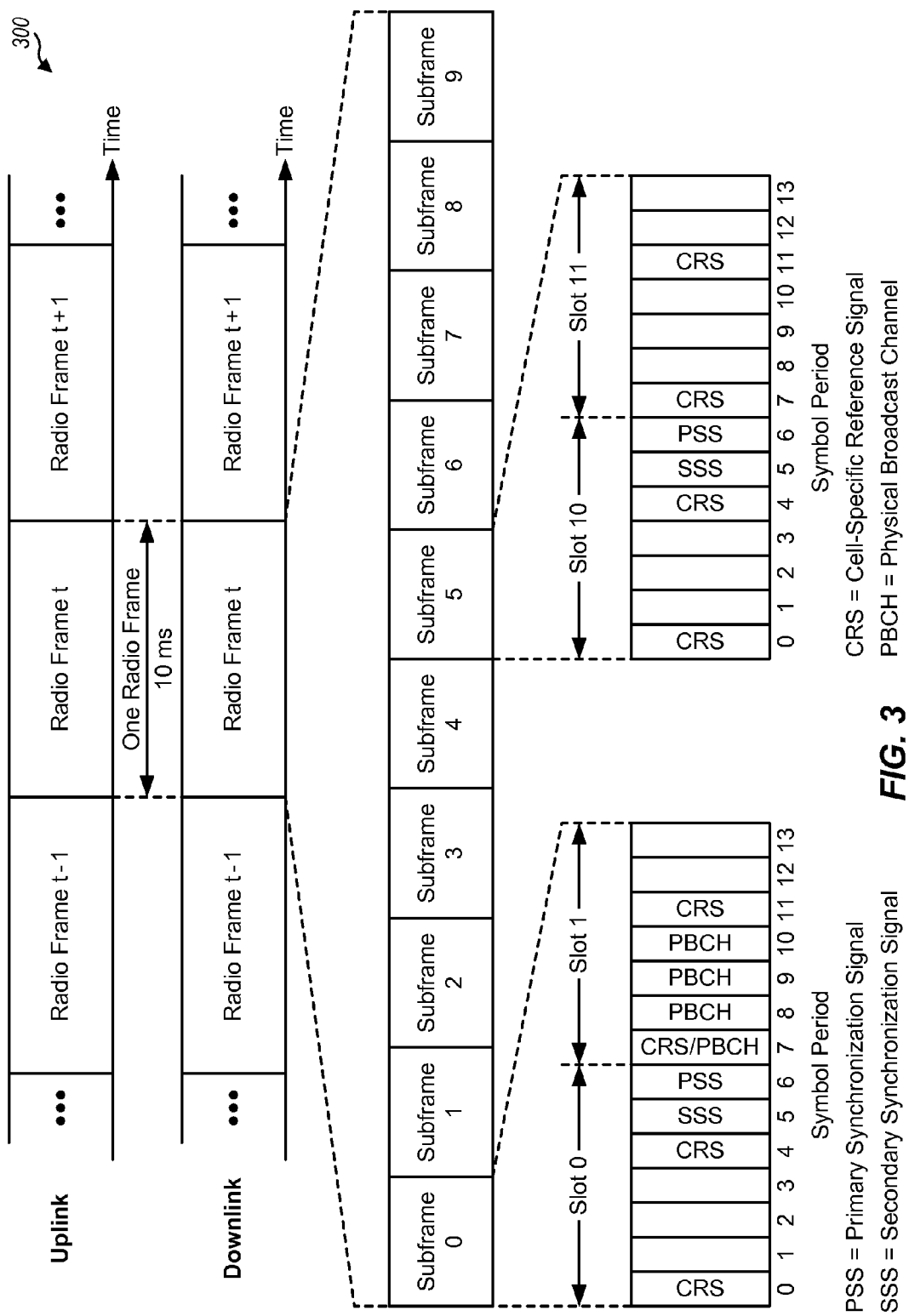
FIG. 3 is a block diagram conceptually illustrating an example of a frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
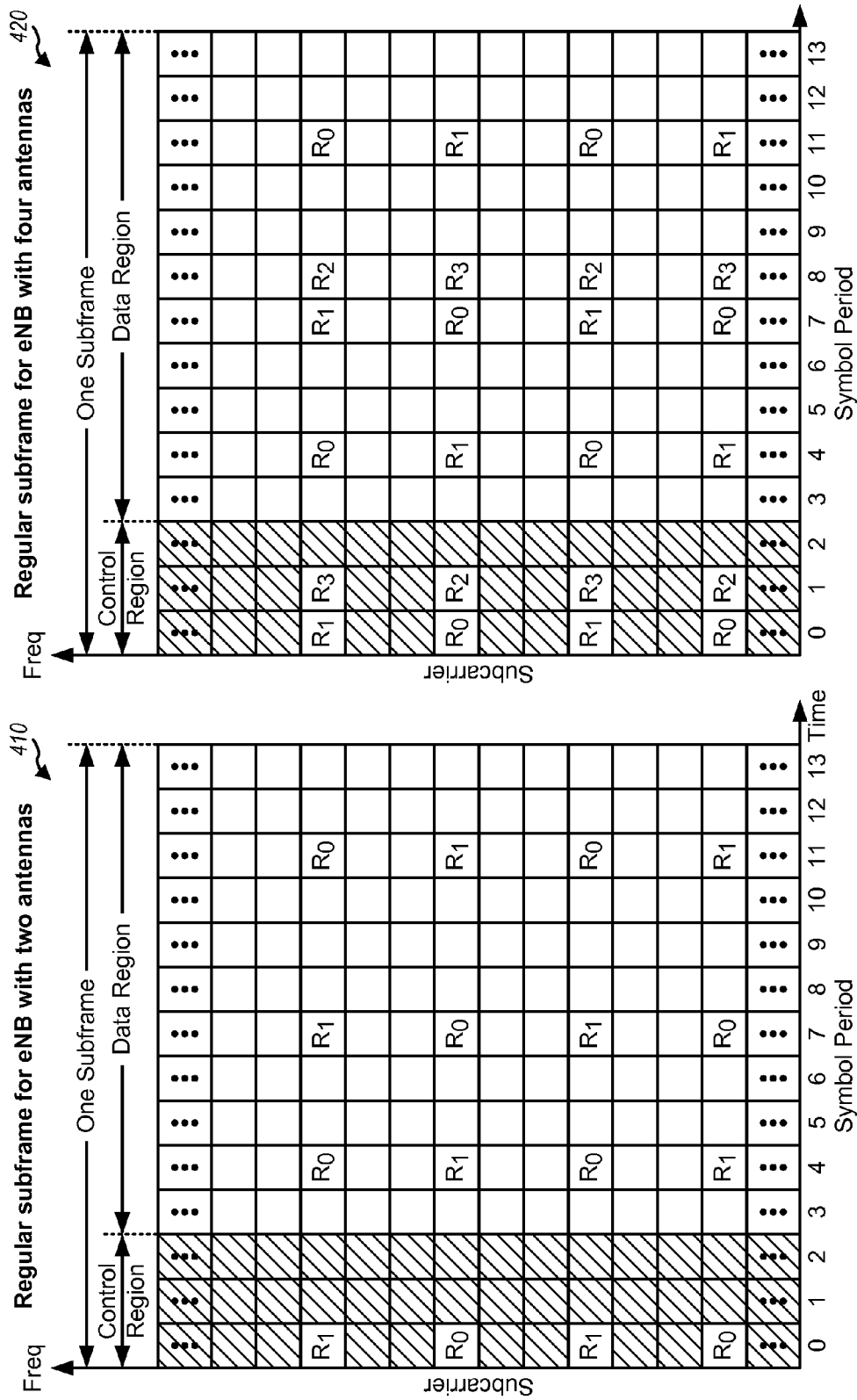
FIG. 4 illustrates two exemplary subframe formats for the downlink with the normal cyclic prefix in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
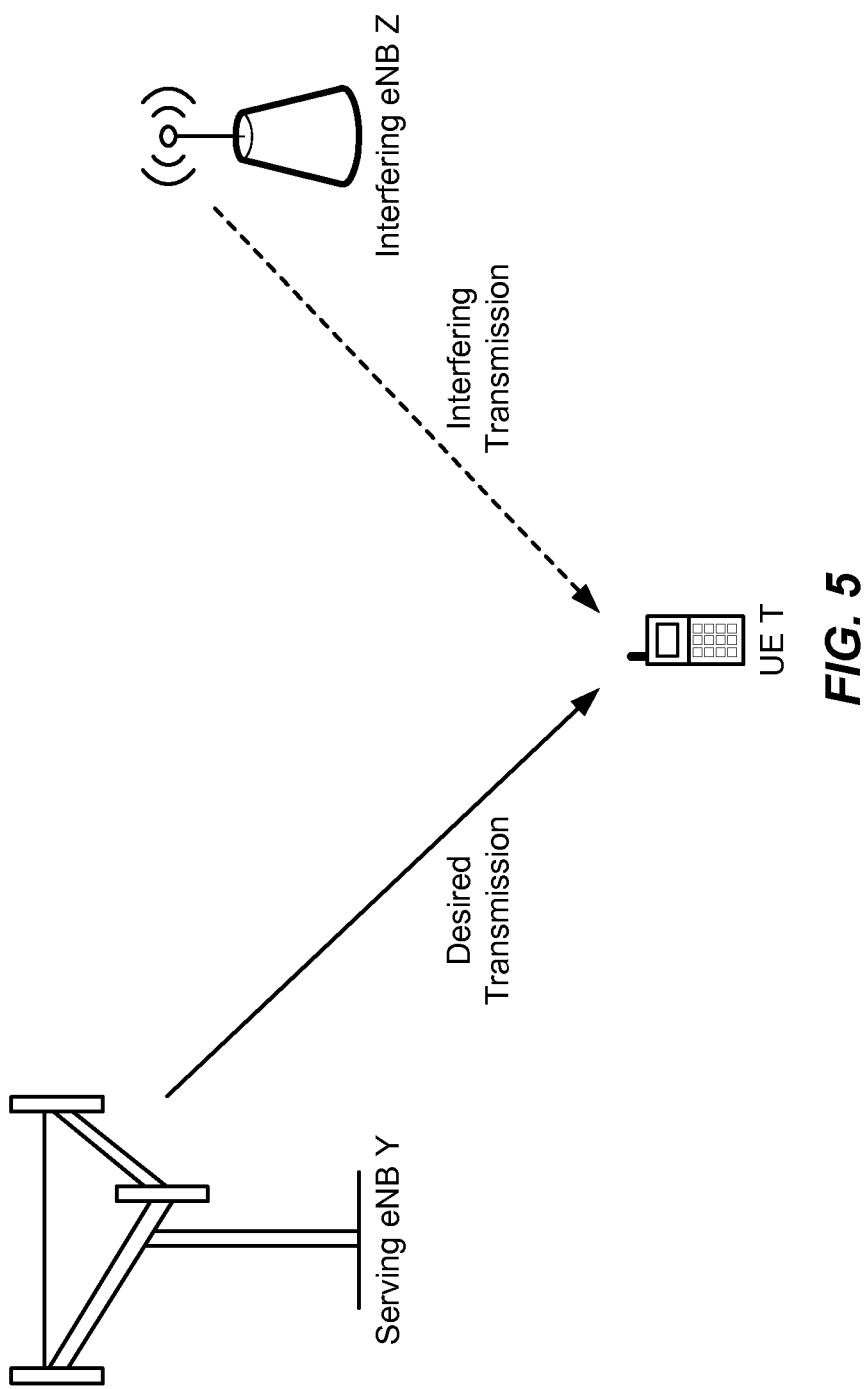
FIG. 5 illustrates an exemplary dominant interference scenario in accordance with certain aspects of the present disclosure.

FIG. 5 shows an exemplary dominant interference scenario. In the example shown in FIG. 5, a UE T may communicate with a serving eNB Y and may observe high interference from a strong/dominant interfering eNB Z.

A dominant interference scenario may occur due to restricted association. For example, in FIG. 5, eNB Y may be a macro eNB, and eNB Z may be a femto eNB. UE T may be located close to femto eNB Z and may have high received power for eNB Z. However, UE T may not be able to access femto eNB Z due to restricted association and may then connect to macro eNB Y with lower received power. UE T may then observe high interference from femto eNB Z on the downlink and may also cause high interference to femto eNB Z on the uplink.

A dominant interference scenario may also occur due to range extension, which is a scenario in which a UE connects to an eNB with lower pathloss and possibly lower SINR among all eNBs detected by the UE. For example, in FIG. 5, eNB Y may be a pico eNB, and interfering eNB Z may be a macro eNB. UE T may be located closer to pico eNB Y than macro eNB Z and may have lower pathloss for pico eNB Y. However, UE T may have lower received power for pico eNB Y than macro eNB Z due to a lower transmit power level of pico eNB Y as compared to macro eNB Z. Nevertheless, it may be desirable for UE T to connect to pico eNB Y due to the lower pathloss. This may result in less interference to the wireless network for a given data rate for UE T.

In general, a UE may be located within the coverage of any number of eNBs. One eNB may be selected to serve the UE, and the remaining eNBs may be interfering eNBs. The UE may thus have any number of interfering eNBs. For clarity, much of the description assumes the scenario shown in FIG. 5 with one serving eNB Y and one interfering eNB Z.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 6:
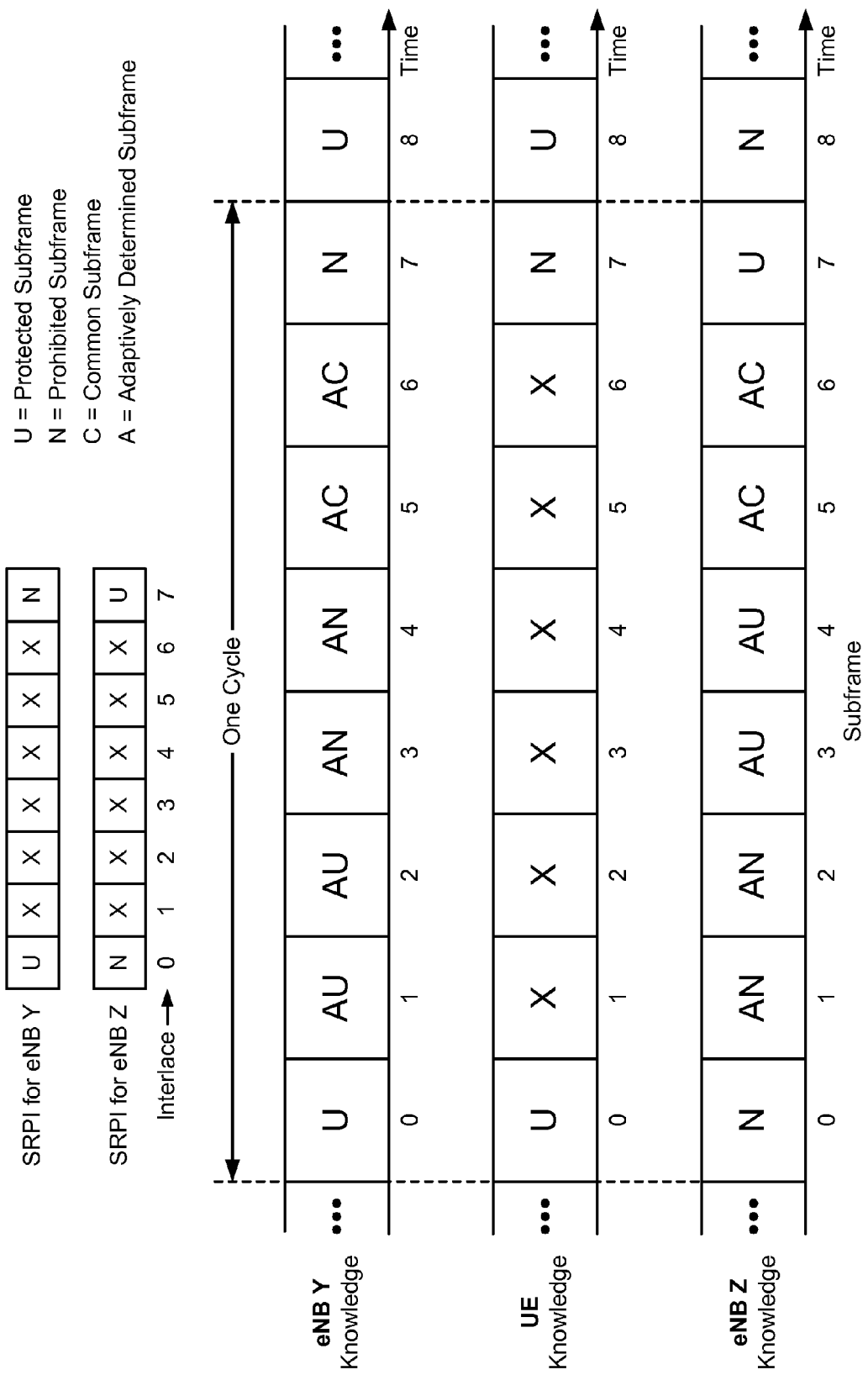
FIG. 6 illustrates example cooperative partitioning of subframes in a heterogeneous network in accordance with certain aspects of the present disclosure.

FIG. 6 shows an example of TDM resource partitioning to support communication in the dominant interference scenario in FIG. 5. In the example shown in FIG. 6, eNB Y may be allocated interlace 0, and eNB Z may be allocated interlace 7 in a semi-static or static manner, e.g., via negotiation between the eNBs through the backhaul. eNB Y can transmit data in subframes of interlace 0 and may avoid transmitting data in subframes of interlace 7. Conversely, eNB Z can transmit data in subframes of interlace 7 and may avoid transmitting data in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common" subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe, an allocated subframe, etc.

TABLE 1

Subframe Types

| Subframe Type | Description | Expected CQI |
|---|---|---|
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit static resource partitioning information (SRPI) to its UEs. According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning. In the example shown in FIG. 6, the SRPI for eNB Y may include "U" for interlace 0, "N" for interlace 7, and "X" for each remaining interlace. The SRPI for eNB Z may include "U" for interlace 7, "N" for interlace 0, and "X" for each remaining interlace.

A UE may estimate received signal quality of a serving eNB based on a CRS from the serving eNB. The UE may determine CQI based on the received signal quality and may report the CQI to the serving eNB. The serving eNB may use the CQI for link adaptation to select a modulation and coding scheme (MCS) for data transmission to the UE. Different types of subframes may have different amounts of interference and hence may have very different CQIs. In particular, protected subframes (e.g., U and AU subframes) may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, the serving eNB should have relatively accurate CQI for each subframe in which the eNB transmits traffic data to the UE.

UE Receiver Reference Signal Processing that Utilizes Resource Partitioning Information As described above, communication in a dominant interference scenario may be supported by performing inter-cell interference coordination (ICIC). According to certain aspects of ICIC, resource coordination/partitioning may be performed to allocate resources to a Node B located near the vicinity of a strong interfering Node B. The interfering Node B may avoid transmitting on the allocated/protected resources (e.g., via TDM partitioning, as illustrated in FIG. 6), possibly except for a CRS. A UE can then communicate with the Node B on the protected resources in the presence of the interfering Node B and may observe no interference (possibly except for the CRS) from the interfering Node B.

Even with TDM partitioning, CRS may always be transmitted by a Node B to maintain backward compatibility (e.g., transmitted in almost blank subframes). For example, although resources may be allocated to an interfering Node B, the serving Node B may transmit a CRS (or another transmission) using the resources allocated to the interfering Node B (e.g., the almost blank subframes). Therefore, transmissions from the interfering Node B may cause significant performance degradation if the serving Node B uses the CRS on the resources allocated to the interfering Node B. For example, in the case that a CRS of the serving Node B is under strong interference, the serving Node B may fail to provide reliable channel estimation. Therefore, certain aspects of the present disclosure provide techniques for a UE receiver in utilizing resource partitioning information (RPI) for performing CRS processing in a heterogeneous network (HetNet).

Figure 7:
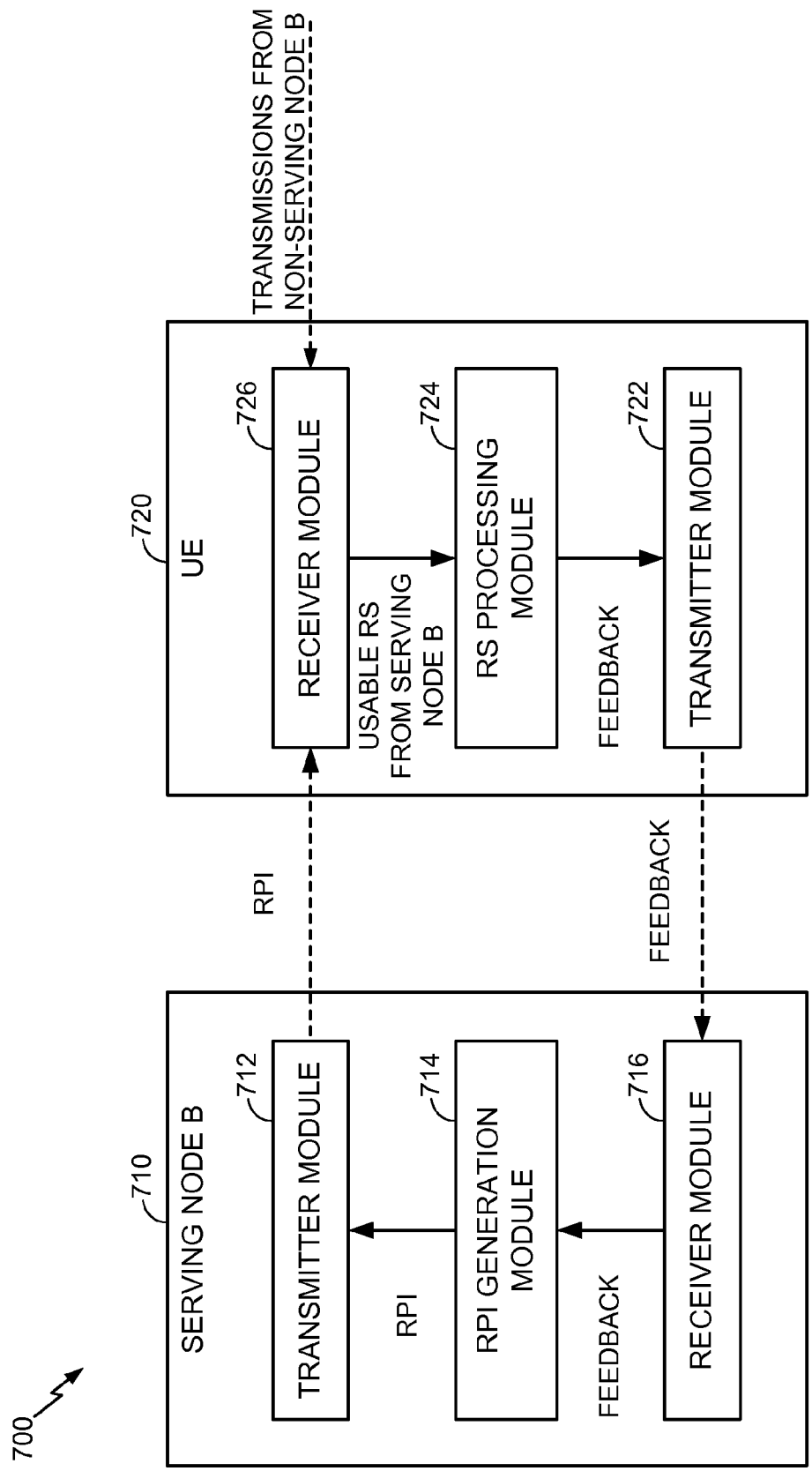
FIG. 7 illustrates an example system with a serving Node B and a UE, capable of utilizing resource partitioning information (RPI) for performing cell-specific reference signal (CRS) processing in a heterogeneous network (HetNet), in accordance with certain aspects of the present disclosure.

FIG. 7 illustrates an example system 700 with a serving Node B 710 and a user equipment (UE) 720, capable of utilizing RPI for performing CRS processing in a HetNet, in accordance with certain aspects of the present disclosure. As illustrated, the serving Node B 710 may include an RPI generation module 714 for generating RPI (e.g., via negotiation between the serving Node B 710 and non-serving Node Bs through the backhaul). The RPI may be transmitted, via a transmitter module 712, to the UE 720.

The UE 720 may receive the RPI via a receiver module 726. While the UE 720 receives RSs from the serving Node B 710, the UE 720 may also receive transmissions from one or more of the non-serving Node Bs that may interfere. Based on the RPI, the UE 720 may determine which subframes to use for CRS processing. As illustrated, the UE 720 may include an RS processing module 724 for processing usable RSs from the serving Node B 710 that are transmitted in the subframes to use for CRS processing, and the UE may perform measurements using the usable RSs. Although not illustrated, the UE 720 may perform measurements using usable RSs from one or more of the non-serving Node Bs. The UE 720 may transmit feedback via a transmitter module 722, and the serving Node B 710 may receive the feedback via a receiver module 716.

FIG. 8 illustrates example operations 800 for performing CRS processing using subframes with little or no interference between a serving Node B and one or more non-serving Node Bs, in accordance with certain aspects of the present disclosure. The operations 800 may be performed, for example, by a UE. At 802, the UE may obtain RPI that identifies one or more subframes that are protected due to cooperative partitioning of resources between the serving Node B and the one or more non-serving Node Bs.

At 804, the UE may identify, based at least in part on the RPI, one or more subframes with little or no interference between the serving and non-serving Node Bs, as will be described further herein.

At 806, the UE may utilize RSs of the identified subframes, but not other subframes, in one or more measurements taken at the UE.

For some embodiments, the UE may use a subset of subframes towards tracking loops (e.g., time tracking loops and frequency tracking loops) and measurements. Examples of measurements comprise radio link monitoring (RLM), reference signal received power (RSRP), and reference signal received quality (RSRQ). The subset of subframes may comprise only "clean" subframes. For example, at 804, the identified subframes may comprise one or more subframes the RPI specifies as usable subframes (e.g., U subframes) for communicating with the serving Node B. For performing CRS processing of a non-serving Node B, RSs of usable subframes allocated to the non-serving Node B may be used.

As another example, the identified subframes may comprise, in addition to the usable subframes, one or more subframes the UE identifies as having good RS quality. For some embodiments, the UE may identify the one or more subframes as having good RS quality based on whether or not transmissions from the non-serving Node Bs interfere on a subframe with serving Node B RSs. For example, the transmissions from the non-serving Node Bs may interfere on the subframe with the serving Node B RSs when at least one of the non-serving Node Bs transmits data on the subframe, the data collides with serving Node B RS tones, and the non-serving Node B has a stronger RS strength than the serving Node B.

For some embodiments, the UE may measure received CRS strength of each cell, which may enable the UE to determine which cells are stronger and weaker than the serving cell. The UE may derive the channel impulse response (CIR) of each cell. The UE may use CRS interference cancellation (IC) to reliably estimate the CIR of weaker cells. For some embodiments, for tracking loops and measurements of each cell (denoted as cell "A"), the UE may use the CIRs derived from the CRS on subframes wherein the SRPI of cell "A" for the subframe is "U".

For other embodiments, the UE may use the CIRs derived from the CRS on subframes wherein there is no strong interference on the CRS of cell "A". A strong interference on the CRS of cell "A" may comprise a cell "B" that has non-colliding CRS tone positions with cell "A". In other words, if there is any control/data transmission from cell "B", there may be interference on the CRS of cell "A". Further, if cell "B" is potentially active on the subframe (e.g., the SRPI is either U or X), control/data transmissions may be transmitted from cell "B". As a further example, a strong interference on the CRS of cell "A" may comprise a cell "B" that has a stronger CRS strength than Cell "A" (i.e., the control/data transmission may cause strong interference).

For some embodiments, the UE receiver may perform partitioning-aware channel estimation. SIB1/paging transmission may not follow time-division multiplexing (TDM) partitioning and may require other methods such as frequency-division multiplexing (FDM) partitioning. When SIB1/paging is transmitted with FDM, special channel estimation for SIB1/paging may be required to utilize the FDM. The special channel estimation may not use RS symbol 0, as it is in the control region and may be under strong interference due to PDCCH transmissions from an interfering Node B. The special channel estimation may utilize the FDM knowledge (RB allocation) to avoid using resource blocks (RBs) under strong interference. For some embodiments, the UE may decide on which channel estimation algorithm to use based on RPI (e.g., SRPI) and other information. For example, the UE may use the special channel estimation algorithm for SIB1/paging if the UE intends to decode SIB1/paging on a subframe (this may be indicated by reception of cross-subframe PDCCH), the RPI of the serving cell for the subframe is either N or X, and there is strong interference on CRS of the serving cell. Otherwise, the UE may use a regular channel estimation algorithm.

CRSs on OFDM symbol 7 in case of normal cyclic prefix (CP) (symbols 6 and 9 in extended CP) in subframe 0 of each radio frame may see strong interference from neighboring physical broadcast channel (PBCH) transmission, as illustrated in FIG. 3. For some embodiments, the UE may avoid using the CRS tones strongly interfered by PBCH. For example, for channel estimation of cell "A", the UE may avoid using the CRS tones strongly interfered by PBCH of neighboring cells (e.g., cell "B"). For some embodiments, strong interference from PBCH of a cell "B" to CRS of cell "A" may comprise the cell "B" having non-colliding CRS tone positions with cell "A". In other words, PBCH transmission from cell "B" may create interference on CRS of cell "A". For other embodiments, Cell "B" may have a stronger CRS strength than Cell "A", wherein the PBCH transmission may cause strong interference.

Referring back to FIG. 8, the UE may identify, within at least one of the identified subframes (with little or no interference between the serving and non-serving Node Bs), one or more regions (e.g., resource blocks and symbols) that are protected from other regions that are not protected. For some embodiments, at 806, the UE may utilize RSs of the protected regions, but not the other regions, in the one or more measurements taken at the UE, wherein utilizing the RSs of the protected regions may comprise performing a channel estimation that does not use an RS symbol outside the protected regions. The other regions that are not protected may comprise physical broadcast channel (PBCH) transmissions and system information block (SIB) transmissions from the non-serving Node Bs, wherein the transmissions may not follow resource partitioning, as described above.

For some embodiments, the UE receiver may perform partitioning-aware interference estimation by taking the active interferers, and only those, into account toward interference estimation.

FIG. 9 illustrates example operations 900 for performing partitioning-aware interference estimation, in accordance with certain aspects of the present disclosure. The operations 900 may be performed, for example, by a UE. At 902, the UE may obtain RPI that identifies one or more subframes that are protected due to cooperative partitioning of resources between a serving Node B and one or more non-serving Node Bs At 904, the UE may identify, based at least in part on the RPI, the one or more non-serving Node Bs that contribute interference on serving Node B data on a given subframe.

At 906, the UE may count the non-serving Node Bs that contribute interference, but not other non-serving Node Bs, toward estimating interference at the UE, wherein estimating the interference may comprise performing RS interference cancellation (IC) and using post-IC RS tones to estimate raw interference. For each non-serving Node B that is determined to contribute interference, whose RS tones have been canceled, and whose RS tones collide with serving Node B RS tones, the UE may add a covariance estimate of a received signal from the non-serving Node B into the raw interference estimate.

The raw interference estimate may be based on CRS, or on other signals such as data tones or UE-RS. Post-IC CRS tones may be used to estimate raw interference. This may capture background interference as well as interference from cells with non-colliding CRS positions. For each of the interfering cells with colliding CRS positions, the UE may explicitly add the covariance estimate of the received signal from the cell into raw interference estimation (termed "Nt add-back"), if the interfering cell is potentially active. The interfering cell may be considered active if RPI of the cell is U or X. Further, whether the interfering cell is active or not may be based on a combination of SRPI and other information (e.g., loading indicator).

An example design for determining the partitioning-aware interference estimation is:

$$y = h_0 x_0 + h_1 x_1 + h_2 x_2 + h_3 x_3 + n$$

where n: background interference and noise,
$h_0 x_0$: serving cell channel and signal,
$h_i x_i$ (i>0): interferer i channel and signal,
Interferer 1: colliding RS with the serving cell, actively transmitting data
Interferer 2: colliding RS with the serving cell, inactive (x2=0), and
Interferer 3: non-colliding RS with the serving cell; may or may not be active.

After CRS interference cancellation of Interferers 1, 2, and 3, the serving cell CRS tones may see $h_3 x_3 + n$ as interference. Therefore, Interferer 3 ($h_3 x_3$), if active, is captured, but Interferer 1 ($h_1 x_1$) and Interferer 2 ($h_2 x_2$) may not be captured into the raw interference estimation. Since the serving cell sees interference from Interferer 1 and 3, but Interferer 1 has not been captured, Nt add-back of Interferer 1 may be required. Since Interferer 2 is inactive in data transmission, Nt add-back of Interferer 2 may be unnecessary. Therefore, the final interference estimation may be:

$$R_{nn} + h_1 h_1^*,$$

where $R_{nn}$ may be the raw interference estimation capturing the background interference and noise (n) and interference from Interferer 3 ($h_3 x_3$).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   obtaining, at a user equipment (UE), resource partitioning information (RPI) that identifies one or more subframes that are protected due to cooperative partitioning of resources between a serving Node B and one or more non-serving Node Bs;
   identifying, based at least in part on the RPI, one or more subframes with little or no interference between the serving and non-serving Node Bs; and
   utilizing reference signals (RSs) of the identified subframes, but not other subframes, in one or more measurements taken at the UE.

2. The method of claim 1, wherein:
   the identified subframes comprise one or more subframes the RPI specifies as usable subframes for communicating with the serving Node B.

3. The method of claim 2, wherein:
   the identified subframes comprise, in addition to the usable subframes, one or more subframes the UE identifies as having good RS quality.

4. The method of claim 3, wherein the UE identifies the one or more subframes as having good RS quality based on whether or not transmissions from the non-serving Node Bs interfere on a subframe with serving Node B RSs.

5. The method of claim 4, wherein the transmissions from the non-serving Node Bs interfere on the subframe with the serving Node B RSs when at least one of the non-serving Node Bs transmits data on the subframe, the data collides with serving Node B RS tones, and the non-serving Node B has a stronger RS strength than the serving Node B.

6. The method of claim 1, further comprising:
   identifying, within at least one of the identified subframes, one or more regions that are protected from other regions that are not protected.

7. The method of claim 6, wherein the regions comprise resource blocks and symbols.

8. The method of claim 6, wherein the utilizing comprises utilizing RSs of the protected regions, but not the other regions, in the one or more measurements taken at the UE.

9. The method of claim 8, wherein utilizing the RSs of the protected regions comprises tracking loops and the measurements.

10. The method of claim 8, wherein utilizing the RSs of the protected regions comprises performing a channel estimation that does not use an RS symbol outside the protected regions.

11. The method of claim 6, wherein the other regions that are not protected comprise physical broadcast channel (PBCH) transmissions and system information block (SIB) transmissions from the non-serving Node Bs, wherein the transmissions do not follow resource partitioning.

12. The method of claim 1, wherein utilizing the RSs of the identified subframes, but not the other subframes, in the one or more measurements taken at the UE comprises tracking loops and the measurements.

13. The method of claim 12, wherein the loops comprise time tracking loops and frequency tracking loops.

14. The method of claim 12, wherein the measurements comprise radio link monitoring (RLM), reference signal received power (RSRP), and reference signal received quality (RSRQ).

15. An apparatus for wireless communications, comprising:
   means for obtaining, at a user equipment (UE), resource partitioning information (RPI) that identifies one or more subframes that are protected due to cooperative partitioning of resources between a serving Node B and one or more non-serving Node Bs;
   means for identifying, based at least in part on the RPI, one or more subframes with little or no interference between the serving and non-serving Node Bs; and
   means for utilizing reference signals (RSs) of the identified subframes, but not other subframes, in one or more measurements taken at the UE.

16. The apparatus of claim 15, wherein:
   the identified subframes comprise one or more subframes the RPI specifies as usable subframes for communicating with the serving Node B.

17. The apparatus of claim 16, wherein:
   the identified subframes comprise, in addition to the usable subframes, one or more subframes the UE identifies as having good RS quality.

18. The apparatus of claim 17, wherein the UE identifies the one or more subframes as having good RS quality based on whether or not transmissions from the non-serving Node Bs interfere on a subframe with serving Node B RSs.

19. The apparatus of claim 18, wherein the transmissions from the non-serving Node Bs interfere on the subframe with the serving Node B RSs when at least one of the non-serving Node Bs transmits data on the subframe, the data collides with serving Node B RS tones, and the non-serving Node B has a stronger RS strength than the serving Node B.

20. The apparatus of claim 15, further comprising:
   means for identifying, within at least one of the identified subframes, one or more regions that are protected from other regions that are not protected.

21. The apparatus of claim 20, wherein the regions comprise resource blocks and symbols.

22. The apparatus of claim 20, wherein the means for utilizing comprises means for utilizing RSs of the protected regions, but not the other regions, in the one or more measurements taken at the UE.

23. The apparatus of claim 22, wherein the means for utilizing the RSs of the protected regions comprises means for tracking loops and the measurements.

24. The apparatus of claim 22, wherein the means for utilizing the RSs of the protected regions comprises means for performing a channel estimation that does not use an RS symbol outside the protected regions.

25. The apparatus of claim 20, wherein the other regions that are not protected comprise physical broadcast channel (PBCH) transmissions and system information block (SIB) transmissions from the non-serving Node Bs, wherein the transmissions do not follow resource partitioning.

26. The apparatus of claim 15, wherein the means for utilizing the RSs of the identified subframes, but not the other subframes, in the one or more measurements taken at the UE comprises means for tracking loops and the measurements.

27. The apparatus of claim 26, wherein the loops comprise time tracking loops and frequency tracking loops.

28. The apparatus of claim 26, wherein the measurements comprise radio link monitoring (RLM), reference signal received power (RSRP), and reference signal received quality (RSRQ).

29. An apparatus for wireless communications, comprising:
at least one processor configured to:
obtain, at a user equipment (UE), resource partitioning information (RPI) that identifies one or more subframes that are protected due to cooperative partitioning of resources between a serving Node B and one or more non-serving Node Bs;
identify, based at least in part on the RPI, one or more subframes with little or no interference between the serving and non-serving Node Bs; and
utilize reference signals (RSs) of the identified subframes, but not other subframes,
in one or more measurements taken at the UE; and
a memory coupled to the at least one processor.

30. The apparatus of claim 29, wherein:
the identified subframes comprise one or more subframes the RPI specifies as usable subframes for communicating with the serving Node B.

31. The apparatus of claim 30, wherein:
the identified subframes comprise, in addition to the usable subframes, one or more subframes the UE identifies as having good RS quality.

32. The apparatus of claim 31, wherein the UE identifies the one or more subframes as having good RS quality based on whether or not transmissions from the non-serving Node Bs interfere on a subframe with serving Node B RSs.

33. The apparatus of claim 32, wherein the transmissions from the non-serving Node Bs interfere on the subframe with the serving Node B RSs when at least one of the non-serving Node Bs transmits data on the subframe, the data collides with serving Node B RS tones, and the non-serving Node B has a stronger RS strength than the serving Node B.

34. The apparatus of claim 29, wherein the at least one processor is configured to:
identify, within at least one of the identified subframes, one or more regions that are protected from other regions that are not protected.

35. The apparatus of claim 34, wherein the regions comprise resource blocks and symbols.

36. The apparatus of claim 34, wherein the at least one processor is configured to utilize RSs of the protected regions, but not the other regions, in the one or more measurements taken at the UE.

37. The apparatus of claim 36, wherein the at least one processor is configured to track loops and the measurements.

38. The apparatus of claim 36, wherein the at least one processor is configured to perform a channel estimation that does not use an RS symbol outside the protected regions.

39. The apparatus of claim 34, wherein the other regions that are not protected comprise physical broadcast channel (PBCH) transmissions and system information block (SIB) transmissions from the non-serving Node Bs, wherein the transmissions do not follow resource partitioning.

40. The apparatus of claim 29, wherein the at least one processor configured to utilize the RSs of the identified subframes, but not the other subframes, in the one or more measurements taken at the UE is further configured to track loops and the measurements.

41. The apparatus of claim 40, wherein the loops comprise time tracking loops and frequency tracking loops.

42. The apparatus of claim 40, wherein the measurements comprise radio link monitoring (RLM), reference signal received power (RSRP), and reference signal received quality (RSRQ).

43. A computer-program product for wireless communications, the computer-program product comprising:
a non-transitory computer-readable medium having code for:
obtaining, at a user equipment (UE), resource partitioning information (RPI) that identifies one or more subframes that are protected due to cooperative partitioning of resources between a serving Node B and one or more non-serving Node Bs;
identifying, based at least in part on the RPI, one or more subframes with little or no interference between the serving and non-serving Node Bs; and
utilizing reference signals (RSs) of the identified subframes, but not other subframes, in one or more measurements taken at the UE.

44. The computer-program product of claim 43, wherein:
the identified subframes comprise one or more subframes the RPI specifies as usable subframes for communicating with the serving Node B.

45. The computer-program product of claim 44, wherein:
the identified subframes comprise, in addition to the usable subframes, one or more subframes the UE identifies as having good RS quality.

46. The computer-program product of claim 45, wherein the UE identifies the one or more subframes as having good RS quality based on whether or not transmissions from the non-serving Node Bs interfere on a subframe with serving Node B RSs.

47. The computer-program product of claim 46, wherein the transmissions from the non-serving Node Bs interfere on the subframe with the serving Node B RSs when at least one of the non-serving Node Bs transmits data on the subframe, the data collides with serving Node B RS tones, and the non-serving Node B has a stronger RS strength than the serving Node B.

48. The computer-program product of claim 43, further comprising code for:
identifying, within at least one of the identified subframes, one or more regions that are protected from other regions that are not protected.

49. The computer-program product of claim 48, wherein the regions comprise resource blocks and symbols.

50. The computer-program product of claim 48, wherein the code for utilizing comprises code for utilizing RSs of the protected regions, but not the other regions, in the one or more measurements taken at the UE.

51. The computer-program product of claim 50, wherein the code for utilizing the RSs of the protected regions comprises code for tracking loops and the measurements.

52. The computer-program product of claim 50, wherein the code for utilizing the RSs of the protected regions comprises code for performing a channel estimation that does not use an RS symbol outside the protected regions.

53. The computer-program product of claim 48, wherein the other regions that are not protected comprise physical broadcast channel (PBCH) transmissions and system information block (SIB) transmissions from the non-serving Node Bs, wherein the transmissions do not follow resource partitioning.

54. The computer-program product of claim 43, wherein the code for utilizing the RSs of the identified subframes, but not the other subframes, in the one or more measurements taken at the UE comprises code for tracking loops and the measurements.

55. The computer-program product of claim 54, wherein the loops comprise time tracking loops and frequency tracking loops.

56. The computer-program product of claim 54, wherein the measurements comprise radio link monitoring (RLM), reference signal received power (RSRP), and reference signal received quality (RSRQ).

57. A method for wireless communications, comprising:
obtaining, at a user equipment (UE), resource partitioning information (RPI) that identifies one or more subframes that are protected due to cooperative partitioning of resources between a serving Node B and one or more non-serving Node Bs;
identifying, based at least in part on the RPI, the one or more non-serving Node Bs that contribute interference on serving Node B data on a given subframe; and
counting the non-serving Node Bs that contribute interference, but not other non-serving Node Bs, toward estimating interference at the UE.

58. The method of claim 57, wherein the counting comprises performing reference signal (RS) interference cancellation (IC) and using post-IC RS tones to estimate raw interference.

59. The method of claim 58, further comprising, for each non-serving Node B that is determined to contribute interference, whose RS tones have been canceled, and whose RS tones collide with serving Node B RS tones, adding a covariance estimate of a received signal from the non-serving Node B into the raw interference estimate.

60. An apparatus for wireless communications, comprising:
means for obtaining, at a user equipment (UE), resource partitioning information (RPI) that identifies one or more subframes that are protected due to cooperative partitioning of resources between a serving Node B and one or more non-serving Node Bs;
means for identifying, based at least in part on the RPI, the one or more non-serving Node Bs that contribute interference on serving Node B data on a given subframe; and
means for counting the non-serving Node Bs that contribute interference, but not other non-serving Node Bs, toward estimating interference at the UE.

61. The apparatus of claim 60, wherein the means for counting comprises means for performing reference signal (RS) interference cancellation (IC) and using post-IC RS tones to estimate raw interference.

62. The apparatus of claim 61, further comprising, for each non-serving Node B that is determined to contribute interference, whose RS tones have been canceled, and whose RS tones collide with serving Node B RS tones, means for adding a covariance estimate of a received signal from the non-serving Node B into the raw interference estimate.

63. An apparatus for wireless communications, comprising:
at least one processor configured to:
obtain, at a user equipment (UE), resource partitioning information (RPI) that identifies one or more subframes that are protected due to cooperative partitioning of resources between a serving Node B and one or more non-serving Node Bs;
identify, based at least in part on the RPI, the one or more non-serving Node Bs that contribute interference on serving Node B data on a given subframe; and
count the non-serving Node Bs that contribute interference, but not other non-serving Node Bs, toward estimating interference at the UE; and
a memory coupled to the at least one processor.

64. The apparatus of claim 63, wherein the at least one processor is further configured to perform reference signal (RS) interference cancellation (IC) and using post-IC RS tones to estimate raw interference.

65. The apparatus of claim 64, wherein the at least one processor is configured to, for each non-serving Node B that is determined to contribute interference, whose RS tones have been canceled, and whose RS tones collide with serving Node B RS tones, add a covariance estimate of a received signal from the non-serving Node B into the raw interference estimate.

66. A computer-program product for wireless communications, the computer-program product comprising:
a non-transitory computer-readable medium having code for:
obtaining, at a user equipment (UE), resource partitioning information (RPI) that identifies one or more subframes that are protected due to cooperative partitioning of resources between a serving Node B and one or more non-serving Node Bs;
identifying, based at least in part on the RPI, the one or more non-serving Node Bs that contribute interference on serving Node B data on a given subframe; and
counting the non-serving Node Bs that contribute interference, but not other non-serving Node Bs, toward estimating interference at the UE.

67. The computer-program product of claim 66, wherein the code for counting comprises code for performing reference signal (RS) interference cancellation (IC) and using post-IC RS tones to estimate raw interference.

68. The computer-program product of claim 67, further comprising code for, for each non-serving Node B that is determined to contribute interference, whose RS tones have been canceled, and whose RS tones collide with serving Node B RS tones, adding a covariance estimate of a received signal from the non-serving Node B into the raw interference estimate.

* * * * *